United States Patent
Gupta et al.

(10) Patent No.: US 9,674,407 B2
(45) Date of Patent: Jun. 6, 2017

(54) SYSTEM AND METHOD FOR INTERACTIVE IMAGE CAPTURE FOR A DEVICE HAVING A CAMERA

(75) Inventors: Kartavya Mohan Gupta, Alwar (IN); Lalitha M. Eswara, Bangalore (IN); Gowrisankar M R, Bangalore (IN); Charles Cameron Brackett, Pewaukee, WI (US)

(73) Assignee: Honeywell International Inc., Morris Plains, NJ (US)

( * ) Notice: Subject to any disclaimer, the term of this patent is extended or adjusted under 35 U.S.C. 154(b) by 843 days.

(21) Appl. No.: 13/396,303

(22) Filed: Feb. 14, 2012

(65) Prior Publication Data

US 2013/0208180 A1    Aug. 15, 2013

(51) Int. Cl.
   *H04N 5/225*    (2006.01)
(52) U.S. Cl.
   CPC ......... *H04N 5/2251* (2013.01); *H04N 5/2256* (2013.01)
(58) Field of Classification Search
   CPC ........................... H04N 5/2251; H04N 5/2256
   USPC ................................................. 348/370, 371
   See application file for complete search history.

(56) References Cited

U.S. PATENT DOCUMENTS

| | | | |
|---|---|---|---|
| 4,860,217 A | 8/1989 | Sasaki et al. | |
| 5,967,979 A | 10/1999 | Taylor et al. | |
| 6,939,027 B2 * | 9/2005 | Harumoto | 362/336 |
| 7,248,724 B2 | 7/2007 | Gutenev | |
| 7,701,506 B2 | 4/2010 | Silverbrook | |
| 7,760,905 B2 | 7/2010 | Rhoads et al. | |
| 7,792,325 B2 | 9/2010 | Rhoads et al. | |
| 7,826,088 B2 | 11/2010 | Silverbrook | |
| 2007/0242154 A1 * | 10/2007 | Cope | 348/370 |
| 2007/0276195 A1 | 11/2007 | Xu et al. | |
| 2007/0276309 A1 | 11/2007 | Xu et al. | |
| 2008/0071161 A1 | 3/2008 | Jaeb et al. | |
| 2008/0146277 A1 | 6/2008 | Anglin et al. | |
| 2008/0284902 A1 * | 11/2008 | Konno et al. | 348/370 |
| 2009/0073275 A1 * | 3/2009 | Awazu | 348/222.1 |
| 2010/0121201 A1 | 5/2010 | Papaioannou | |
| 2010/0261197 A1 | 10/2010 | Goldberg et al. | |
| 2011/0286003 A1 * | 11/2011 | Ono | 356/495 |
| 2012/0314051 A1 * | 12/2012 | Kawakami | 348/79 |

\* cited by examiner

*Primary Examiner* — Padma Haliyur
(74) *Attorney, Agent, or Firm* — Wood, Phillips, Katz, Clark & Mortimer

(57) ABSTRACT

A guidance system (10) is provided for interactive image capture for use with a device (12) having a camera (14) with a camera lens(s) 16. The system (10) includes a housing (20) configured to be mounted on the device (12), and a light source (22) mounted in the housing (20). The housing (20) and the light source (22) are configured to project a lighted boundary (24) onto a surface (26) in response to a control signal, with the boundary (24) defining a region of image capture (27) by the camera (14). The light source (22) is configured to selectively project the boundary (24) in a first color and to selectively project the boundary (24) in a second color, with the first and second colors providing feedback information to a user regarding the statue of image capture by the camera.

24 Claims, 5 Drawing Sheets

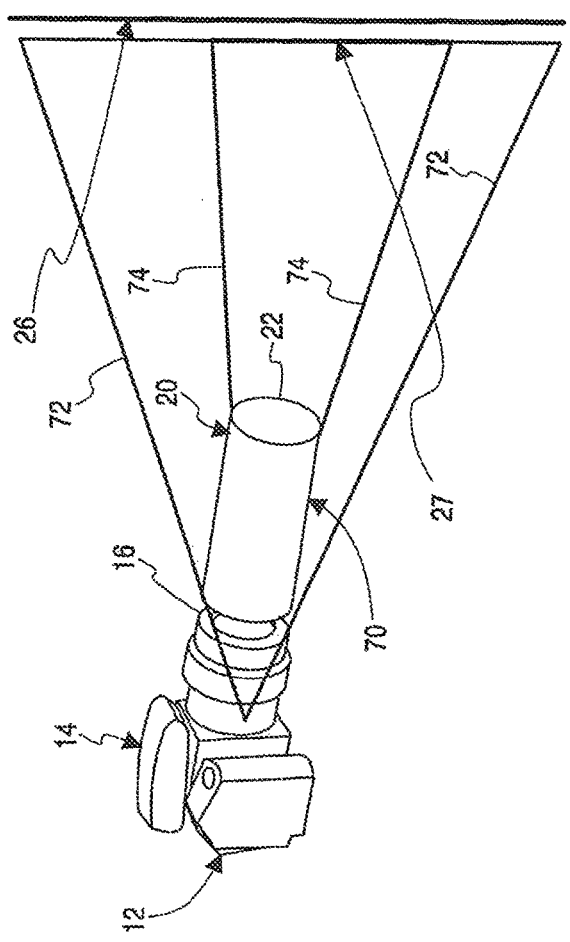
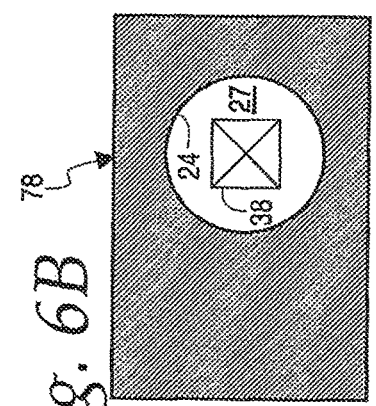
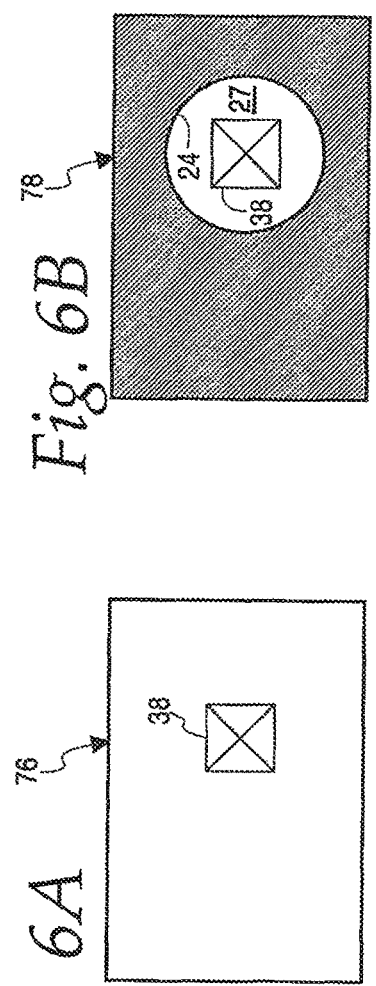
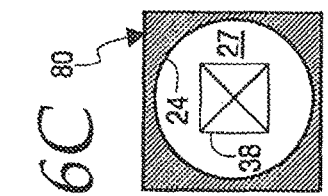

SYSTEM AND METHOD FOR INTERACTIVE IMAGE CAPTURE FOR A DEVICE HAVING A CAMERA

CROSS-REFERENCE TO RELATED APPLICATIONS

Not Applicable.

FEDERALLY SPONSORED RESEARCH OR DEVELOPMENT

Not Applicable.

MICROFICHE/COPYRIGHT REFERENCE

Not Applicable.

Field

This application relates to the capturing of visual data, and more particularly to interactive systems and methods for capturing visual data.

Background

In systems using a handheld or a fixed mounted camera to capture an image or video, a display screen is typically needed for the purpose of interactive correction of the camera focus and region of image capture (frame) by a user. Without such a display screen, there is no feedback to a user for correction of the camera.

In healthcare, remote monitoring of patients to avoid multiple hospital visits is increasingly finding acceptance. In this context, it can be critical for the patient to place health monitoring sensors correctly before capturing monitored health parameters or indicators. In this regard, there are known devices that assist in capturing many vital parameters for remote health assessment/monitoring. Typically, such devices do not have a camera and display and, accordingly, do not provide an opportunity to opportunity for image capture using a camera, nor the opportunity for a user to see what he/she is capturing and sending to the central station if a camera where to be provided for the device. The situation is the same in applications other than healthcare, where a camera is not provided with a display to reduce cost, there is no feedback to the user about what he/she is capturing in the image/video.

SUMMARY

In accordance with one feature of the invention, a guidance system is provided for interactive image capture for use with a device having a camera. The system includes a housing configured to be mounted on a device having a camera, and a light source in the housing, the light source and housing configured to project a lighted boundary onto a surface, the boundary defining a region of image capture by a camera of a device on which the housing is mounted, the light source configured to project the lighted boundary in response to a control signal.

In one feature, the light source is configured to selectively project the lighted boundary in a first color and to selectively project the lighted boundary in a second color.

As one feature, the light source is configured to project the lighted boundary in different colors, with one of the colors being projected in response to an control signal indicating that an image is being captured by a camera of a device on which the housing is mounted and another one of the colors being projected in response to a control signal indicating that an image has been successfully captured by the camera.

According to one feature, the housing includes a thin slit through which the light source projects the lighted boundary, the thin slit having a shape that generates a desired shape for the lighted boundary and configured so that the light projected therefrom is partly coherent. In a further feature, the thin slit is ring-shaped.

As one feature, the light source includes a first colored light source and a second colored light source.

In one feature, the first colored light source is configured to project light in response to a first high logic state signal and the second colored light is configured to project light in response to a second high logic state signal independent of the first high logic state signal.

According to one feature, the first colored light source includes a first array of light generating elements and the second colored light source includes a second array of light generating elements.

In one feature, the first and second arrays are arranged in a shape that generates a desired shape for the lighted boundary, with the arrays being concentric to each other.

As one feature, the first and second arrays are arranged as concentric circles and the lighted boundary has a ring shape.

According to one feature, the light generating elements comprise light emitting diodes.

In one feature, the first array is connected to a first electrical conduit, the second array is connected to a second electrical conduit, and both arrays are connected to a common electrical ground.

According to one feature, the system further includes a programmable processor configured to send a control signal to the light source indicating that an image is being captured by a camera of a device on which the housing is mounted, and to send another control signal to the light source indicating that an image has been successfully captured by the camera.

In one feature, the programmable processor can be embedded into the device or can be external from the device, such as in a laptop or computer.

In accordance with one feature of the disclosure, a method is described for providing user interactive imaging capture a using a device having a camera. The method includes the steps of: projecting a lighted boundary of a first color onto a surface, the boundary defining a region of image capture by a camera of a device; capturing an image of the region with the camera; and projecting a second color onto the surface to indicate that the image has been successfully captured.

According to one feature, the method further includes the step of projecting a second color includes projecting a lighted boundary of a second color onto the surface.

In one feature, the method further includes the step of automatically determining when an image has been successfully captured by the camera.

As one feature, the method further includes the steps of automatically determining if an image of region of interest has been successfully captured by the camera, and in response to the automatically determining step, automatically initiating the projecting a second color step.

In one feature, the method further includes the steps of transmitting a high logic state signal to initiate the step of projecting a lighted boundary of a first color, and transmitting a high logic state signal to initiate the step of projecting a second color.

According to one feature, the method further includes the step of manually moving the lighted boundary of a first color across the surface during the step of projecting a lighted boundary of a first color. In a further feature, the method of further includes the steps of automatically determining if an image of region of interest has been successfully captured by the camera, and in response to the automatically determining step, automatically initiating the projecting a second color step.

As one feature, light generating elements can be used to illuminate the region of interest, thereby avoiding the dependence on bright external light or camera flash. In a further feature, the light generating elements can generate white broad spectrum light to avoid interference with the image capture.

As one feature, the system further includes a collimator tube to reduce the amount of image information captured by the camera.

Other features and advantages will become apparent from a review of the entire specification, including the appended claims and drawings.

BRIEF DESCRIPTION OF THE DRAWINGS

FIG. 5 is a partial diagrammatic representation of another embodiment of the interactive guidance device/system for image capture according to this disclosure, with the device shown slightly spaced from a camera to allow illustration of the camera lens; and FIGS. 6A-6C are illustrations of images captured by the camera and device shown in FIG. 5.

DETAILED DESCRIPTION

Figure 1:
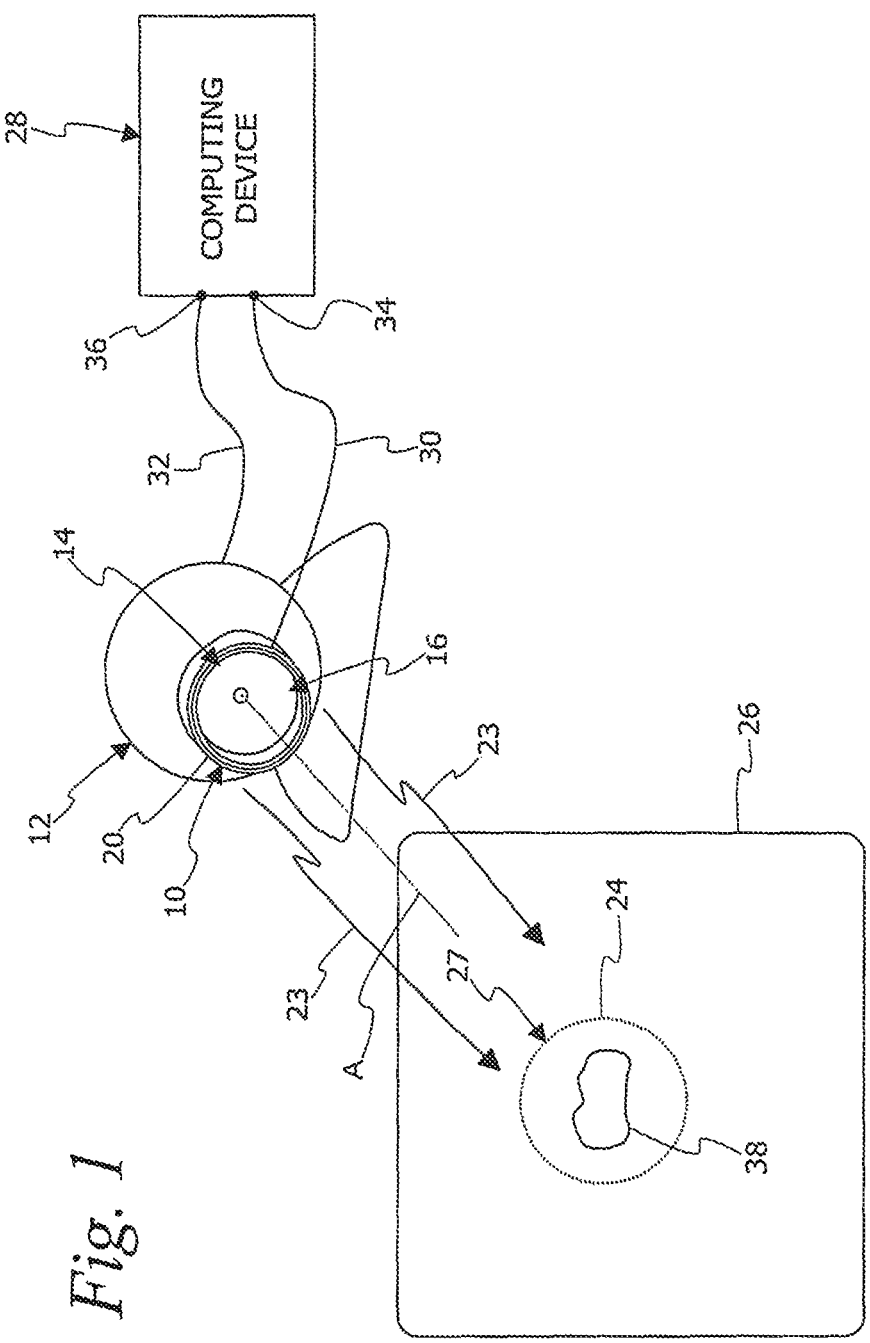
FIG. 1 is a partial diagrammatic representation of an interactive guidance device/system for image capture according to this disclosure mounted on a device having a camera.
Figure 2:
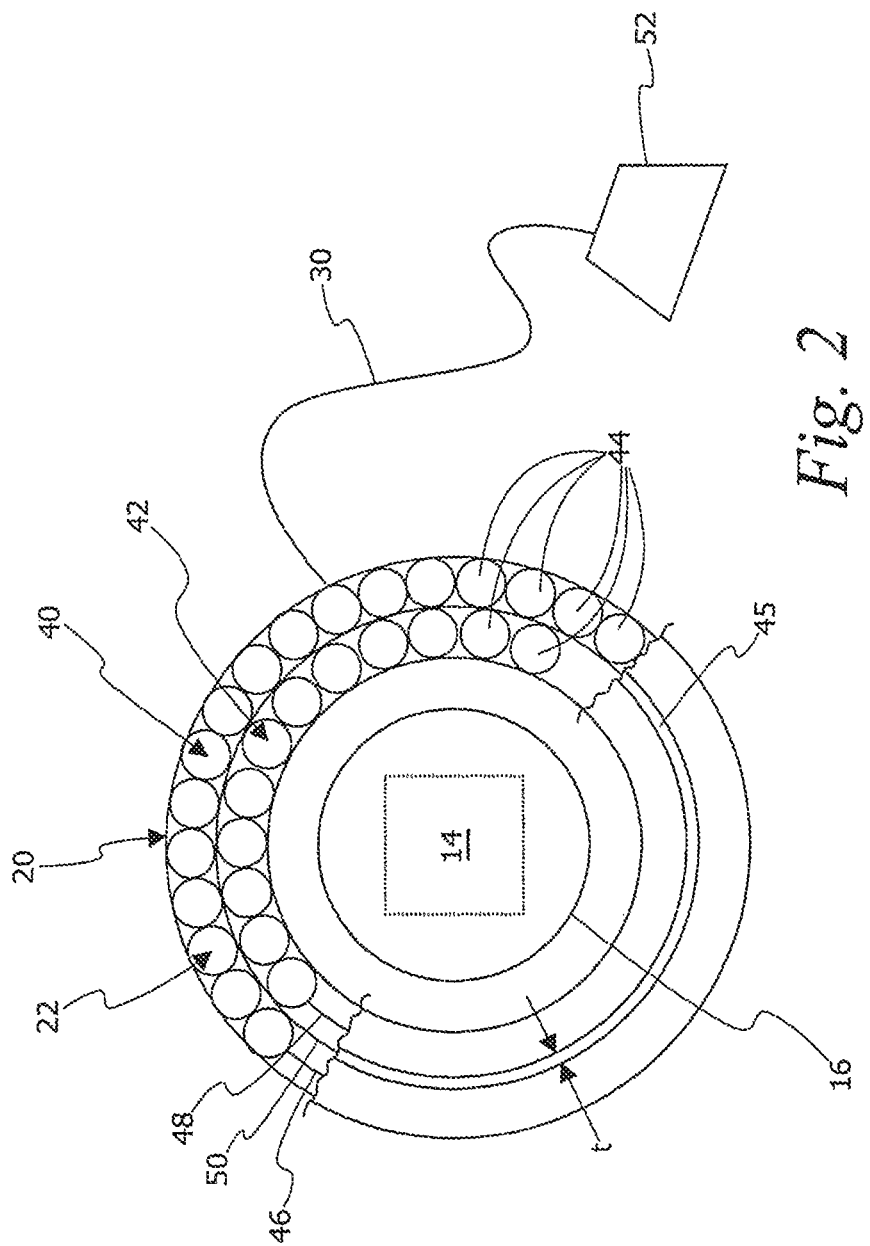
FIG. 2 is a diagrammatic representations of the interactive guidance device/system for image capture of FIG. 1, with a circumferential portion of a system housing broken away so as to better illustrate a light source mounted in the housing.

This disclosure relates to a guidance system 10 that can be easily used with any camera system particularly for handheld sensor placement for guiding a user to capture an appropriate image. In this regard, FIGS. 1-4 show an embodiment of a guidance system 10 for interactive image capture for use with a device 12 having a camera 14 with a camera lens(s) 16. The illustrated system 10 includes a ring-shaped casing or housing 20 configured to be mounted on the device 12, and a light source 22 (shown in FIG. 2) mounted in the housing 20. As shown in FIGS. 1 and 2, the housing 20 and the light source 22 can be configured to surround the camera lens 16 and to be concentric with the camera lens 16. In this regard, the exterior of the illustrated housing 20 is a circular casing (made out of any material suitable material, such as metal, plastic, fiber etc) of a radius larger than the radius of the lens(s) 16 of the camera 14, and the interior of the housing 20 can be reflective so as to enhance the light projected from the light source 22. As illustrated diagrammatically at 23 in FIG. 1, the housing 20 and the light source 22 are configured to project a lighted boundary 24 onto a surface 26, with the boundary 24 defining a region of image capture 27 by the camera 16. Further in this regard, as shown in FIG. 1, the housing and the light source 22 can be configured to project the lighted boundary parallel to the optical axis A of the lens 16 and/or perpendicular to the face of the housing 20.

While the housing 20 and light source 22 are shown as being a ring-shaped, it should be understood that the housing 20 and light source 22 can be of any shape, both regular and irregular, that can provide a desired shape for the boundary 24 and the region of image capture 27 defined thereby. Furthermore, while a specific device 12 has been shown in FIG. 1, it should be understood that the system 10 can be used with any device 12 having a camera 14 including, for example, a device 12 that is simply a camera or video recorder, or a device 12 such as a tablet computer, laptop computer, or smart phone having a camera. Additionally, it should be understood that as used herein the term "camera" is intended to refer to any device that captures an image/ visual data, including, for example, thermal images, infrared images, X-ray images, etc. Further, in this regard, it should be understood that the terms "camera", "image", and "image capture" as used herein include "still" cameras and video cameras and the capture of "still" images and "video" images by such cameras, typically in digital form.

The power and control for the system 10 can be provided from a device driving the camera 14. For example, this can be another USB port when using a computing device such as a laptop or a PC. In this regard, in the illustrated embodiment, the system 10 and the device 12 are operatively connected to a programmable processor in the form of a computing device 28 by respective signal conduits 30 and 32 connected to respective ports on the computing device 28, such as respective USB ports 34 and 36. The light source 22 is configured to project the lighted boundary 24 in response to one or more control signals transmitted to the system 10 from the computing device 28 via the signal conduit 30. While specific embodiments have been shown and described, it should be understood that the system 10 is not restricted to any specific kind of port or hardware requirements for powering or operating the system 10. It should further be understood that while the computing device 28 is shown as a component separate from the device 12, in some applications the computing device 28 can be integrated within the device 12 or within the housing 20 of the system 10.

It is anticipated that in many applications of the system 10, the device 12 will be a handheld device that will allow a user to move the device 12 and its camera 14 relative to the surface 26 so as to correctly position the boundary 24 around a region of interest (ROI) 38, such as a wound on the user's body, so that the ROI 38 is within the region of image capture 27 by the camera 14. In this regard, in one application, the device 12 and/or the computing device 28 can be a home health monitoring device or system.

In the illustrated embodiment, the light source 22 is configured to selectively project the lighted boundary 24 in a first color and a second color. The first color can be used to indicate to a user that an image is being captured by the camera 14 and the second color can be used to indicate to a user that the image has been successfully captured by the camera 14. In this regard, as best see in FIG. 2, the light source 22 can be provided in the form of first and second colored light sources (CLS) 40 and 42, with each of the colored light sources 40 and 42 being an array of light generating elements 44, such as light bulbs or the illustrated light emitting diodes 44. While the illustrated CLSs 40 and 42 are shown as concentric rings of the light generating elements 44, other arrangements are possible, such as, for example, alternating the two different colors of light generating elements 44 inside the housing 20 in a single ring/circle, Red-Green-Red-Green for instance. Additionally, the light source 22 can further be configured to illuminate the region of image capture 27, with the light source 22 being configured to further generate white broad spectrum light to avoid interference with the image capture.

As best seen in FIG. 2, the housing 20 can included a circumferentially extending light slit 45 through which light from the CLSs 40 and 42 are projected onto the surface 26, with the slit 45 having an opening dimension t sized so that the light projected therefrom is partly coherent. In the illustrated embodiment, the slit 45 is configured to project the light from the light sources 40 and 42 either parallel to the optical axis of the camera lens 16 or perpendicular to the plane of the front of the housing 20, but can be varied for any intermediate angle as per the needs of each application. It should be understood that while the light slit 45 is shown as being ring-shaped so as to conform with the illustrated shape of the light source 22, the light slit 45 can be any shape, both regular and irregular, that can provide a desired shape for the boundary 24 and the region of image capture 27 defined thereby.

The first CLS 40 can be operatively connected to a first control conduit or wire 46 and the second CLS 42 can be operatively connected to a second control conduit or wire 48, with both the first and second CLS being operatively connected to a common ground conduit or wire 50 and all of the wires 46, 48 and 50 being operatively connected to the signal conduit 30 having a connector 52, such as a USB connector, for connection to the computing device 28. The first CLS 40 is activated/powered to project the boundary 24 in a first color in response to a high logic state signal transmitted on the wire 46 while a low logic state signal is transmitted to the second CLS 42 on the wire 48, and the second CLS 42 is activated/powered to project the boundary 24 in a second color in response to a high logic state signal transmitted on the wire 48 while a low logic state signal is transmitted to the first CLS 40 on the wire 46. Thus, the light source 22 can be controlled and powered by the simple use of high and low logic state signals transmitted from the computing device 28 via the signal conduit 30. This method of powering the system 10 enables efficient power consumption.

The first CLS 40 is used to indicate that the capturing of an image is in progress and to indicate that the position is correct by projecting the boundary 24 in the first color for viewing by a user. The second CLS 42 is used to indicate that the image capture had been completed by projecting the boundary in the second color for viewing by a user.

Figure 3:
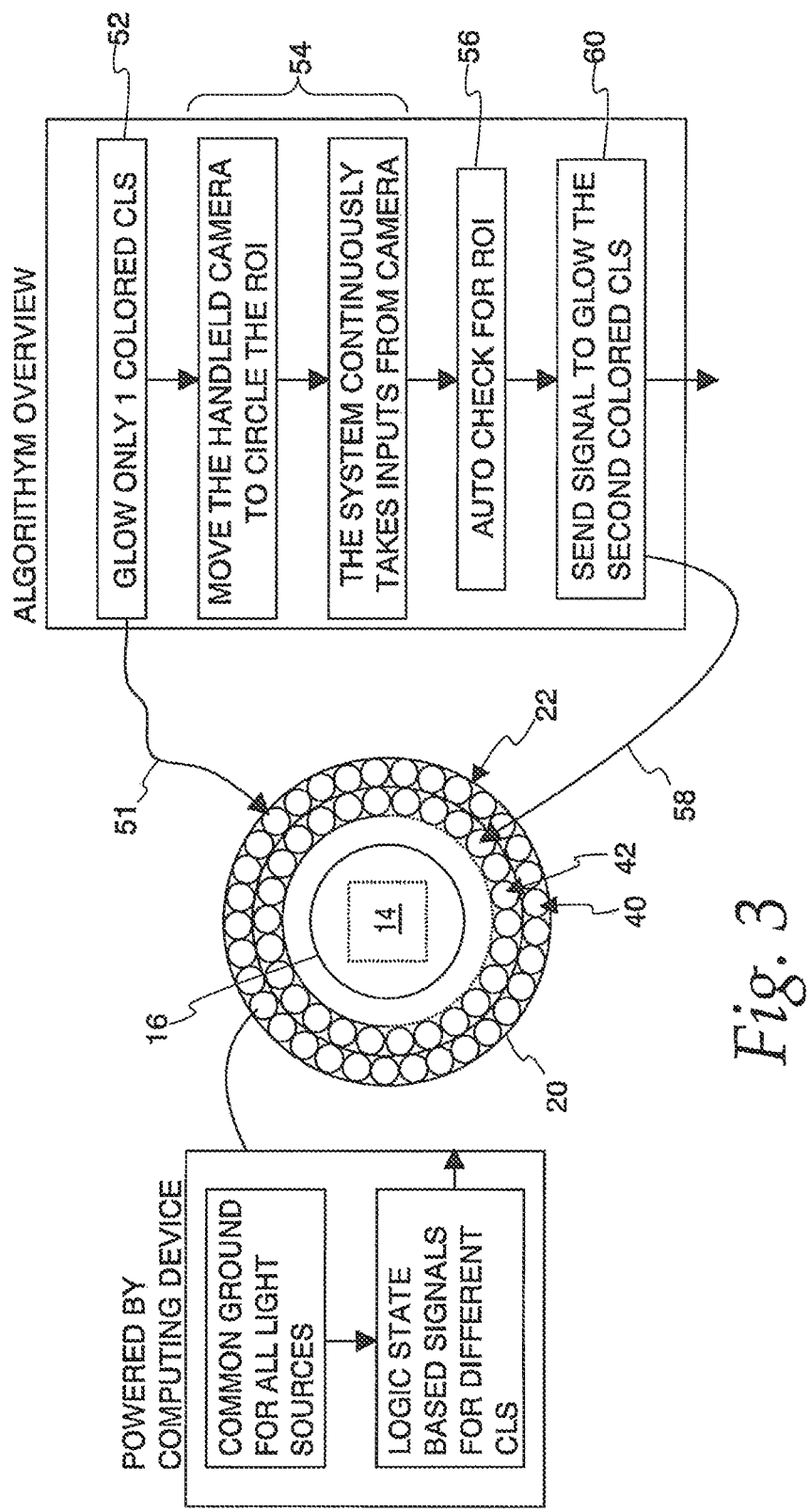
FIG. 3 is a diagrammatic representation of the interactive guidance device/system of FIGS. 1 and 2 and further illustrating a control algorithm of the device/system.
Figure 4:
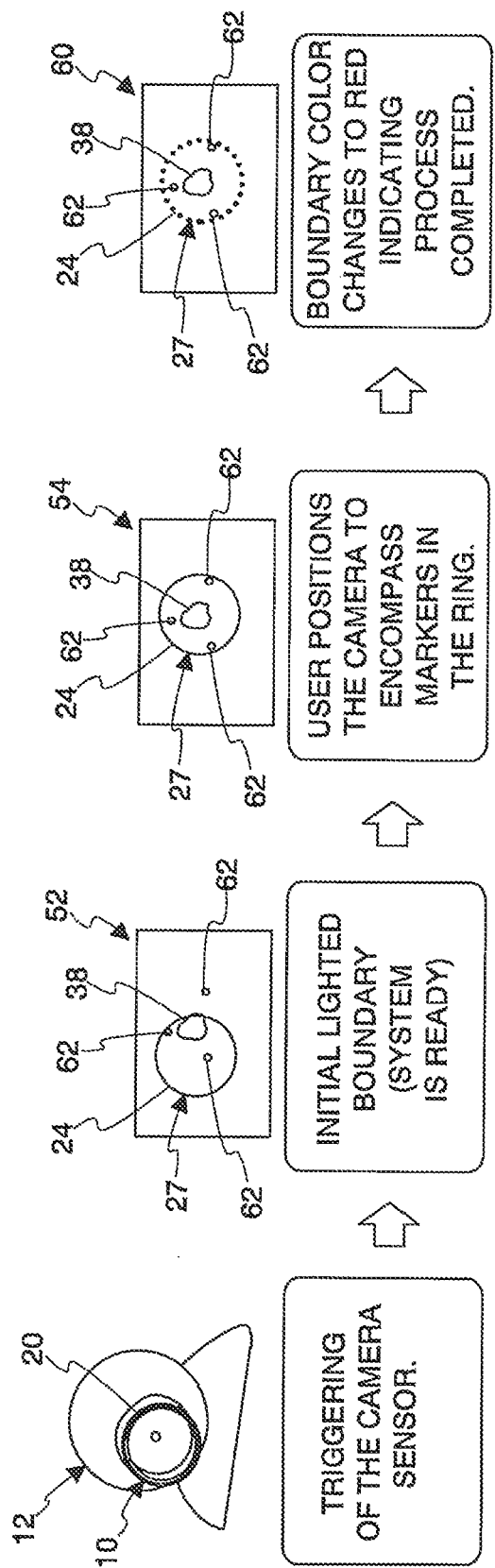
FIG. 4 is a partial diagrammatic representation of a method of interactive image capture with a device having a camera according to this disclosure.

The logic and operation of the system 10 is illustrated in FIGS. 3 and 4. A user initiates image capture via a user interface to the computing device 28 and the computing device 28 sends a high state logic signal 51 (FIG. 3) to the CLS 40 which projects the boundary 24 in the first color, while the computing device 28 starts capturing video images or individual frames via control of the camera 14, as shown at 52 in FIGS. 3 and 4. The user moves the device 12 so that the lighted boundary 24 surrounds the region of interest (ROI) 38 that is considered to be of prime importance, while the camera 14 continuously captures images of the region of image capture 27, as shown at 54 in FIGS. 3 and 4. An auto check can then made by the computing device 28 to see if the ROI 38 is contained within the image, as shown at 56 in FIG. 3, and once the image capture of the ROI 38 is confirmed, the image is saved and a signal 58 is sent to the system 10 for changing the color of the light projected on the user's surface 26, as shown at 60 in FIGS. 3 and 4. This gives feedback to the user that the correct frame is captured. The user can then stop the image capture via the user interface to the computing device 28.

While any suitable technique can be used for the auto check 60 confirming that an suitable image of the ROI 38 has been captured, in the embodiment illustrated in FIG. 4, targets 62, such as temporary ink dots 62, have been positioned in a predetermined pattern around the ROI 38 and the software for the auto check 60 is configured to check each image for the targets 62 in the predetermined pattern and confirm that a suitable image of the ROI 38 has been captured when the targets 62 in the predetermined pattern are found in a single image captured by the camera 14.

It should be appreciated that while the system 10 has been described herein as utilizing just two colors, it is anticipated that the system 10 can be configured to project more than two colors depending on the requirements of each particular application, with each color signifying a specific feedback to the user.

For home health monitoring, a patient using the disclosed system and method 10 can capture an image of a wound as the ROI 38 and the device 12 can transmit the image to a remote location for further analysis, such as by a health care professional. In this regard, the wound 38 needs to be encompassed fully in the image captured. The disclosed system and method 10 can help guide a patient to capture meaningful images for analysis, which is the prime source of inputs for diagnosis. For home health monitoring devices that do not have a display screen, the disclosed system and method can provide an immediate and critical requirement. For home health monitoring devices that do have a visual display, the disclosed system and method can act as an aid to the patient to confirm if the image captured is correct.

With reference to FIGS. 5 and 6A-C, the system 10 can further include an optical collimator tube 70 to assist the system 10 in retaining pixel/image information for only or essentially only the ROI 38 and discarding other pixel/image information so as to minimize the memory storage space required for the captured image and/or the bandwidth required for transmission of the captured image. As seen in FIG. 5, the device 12 in the form of a camera 14 has a field of view indicated by conical lines 72 with the collimator tube 70 having a field of view indicated by the conical lines 74, with the field of view 74 substantially corresponding to the lighted boundary 24. FIG. 6A shows the image 76 that would be typically captured by the camera 14 of the device 12 without the collimator tube 70. FIG. 6B shows the image 78 that is captured when the collimator tube 70 is included in the system 10 with the area outside the lighted boundary 24 consisting of "black" pixels because they are outside the field of view 74 of the collimator tube 70. FIG. 6C shows the image 80 that is to be saved or transmitted when the collimator tube 70 is included with the system 10, with the programmable processor 28 being configured to eliminate "black" pixels that are outside the lighted boundary 24, thereby enabling the system 10 to retain image information for essentially only the ROI 38 while discarding other pixel information to reduce the memory storage space required for the captured image and/or the bandwidth required for transmission of the captured image.

It should be understood that the disclosed system can be a standalone device that can be usefully applied to any device having a camera, particularly handheld devices, and is not limited to health care applications.

The invention claimed is:

1. A guidance system for interactive image capture for use with a device having a camera, the system comprising:

a housing configured to be mounted on a device having a camera; and a light source in the housing, the light source and housing configured to project a lighted boundary onto a surface, the boundary defining a region of image capture by a camera of a device on which the housing is mounted, the light source configured to project the lighted boundary in response to a control signal.

2. The system of claim 1 wherein the light source is configured to selectively project the lighted boundary in a first color and to selectively project the lighted boundary in a second color.

3. The system of claim 1 wherein the light source is configured to project the lighted boundary in different colors, with one of the colors being projected in response to an control signal indicating that an image is being captured by a camera of a device on which the housing is mounted and another one of the colors being projected in response to a control signal indicating that an image has been successfully captured by the camera.

4. The system of claim 1 wherein the housing comprises a thin slit through which the light source projects the lighted boundary, the thin slit having a shape that generates a desired shape for the lighted boundary and configured so that the light projected therefrom is partly coherent.

5. The system of claim 4 wherein the thin slit is ring-shaped.

6. The system of claim 1 wherein the light source comprises a first colored light source and a second colored light source.

7. The system of claim 6 wherein the first colored light source is configured to project light in response to a first high logic state signal and the second colored light is configured to project light in response to a second high logic state signal independent of the first high logic state signal.

8. The system of claim 6 wherein the first colored light source comprises a first array of light generating elements and the second colored light source comprises a second array of light generating elements.

9. The system of claim 8 wherein the first and second arrays are arranged in a shape that generates a desired shape for the lighted boundary, with the arrays being concentric to each other.

10. The system of claim 8 wherein the first and second arrays are arranged as concentric circles and the lighted boundary has a ring shape.

11. The system of claim 8 wherein the light generating elements comprise light emitting diodes.

12. The system of claim 8 wherein the first array is connected to a first electrical conduit, the second array is connected to a second electrical conduit, and both arrays are connected to a common electrical ground.

13. The system of claim 1 further comprising a programmable processor configured to send a control signal to the light source indicating that an image is being captured by a camera of a device on which the housing is mounted, and to send another control signal to the light source indicating that an image has been successfully captured by the camera.

14. The system of claim 1 further comprising a collimator tube configured to reduce the amount of image information captured by the camera.

15. The system of claim 1 wherein the light source and housing are configured to project the lighted boundary parallel to an optical axis of the camera.

16. The system of claim 1 wherein the light source is further configured to illuminate the region of image capture.

17. A method for providing user interactive imaging capture using a device having a camera, the method comprising the steps of:

projecting a lighted boundary of a first color onto a surface, the boundary defining a region of image capture by a camera of a device;

capturing an image of said region with the camera; and projecting a second color onto the surface to indicate that the image has been successfully captured.

18. The method of claim 17 further comprising the step of projecting a second color comprises projecting a lighted boundary of a second color onto the surface.

19. The method of claim 17 further comprising the step of automatically determining when an image has been successfully captured by the camera.

20. The method of claim 17 further comprising the steps of:

automatically determining if an image of region of interest has been successfully captured by the camera; and in response to the automatically determining step, automatically initiating the projecting a second color step.

21. The method of claim 17 further comprising the steps of:

transmitting a high logic state signal to initiate the step of projecting a lighted boundary of a first color; and transmitting a high logic state signal to initiate the step of projecting a second color.

22. The method of claim 17 further comprising the step of manually moving the lighted boundary of a first color across the surface during the step of projecting a lighted boundary of a first color.

23. The method of claim 22 further comprising the steps of:

automatically determining if an image of region of interest has been successfully captured by the camera; and in response to the automatically determining step, automatically initiating the projecting a second color step.

24. The method of claim 17 wherein the image is at least one of a still image and a video image.

* * * * *